(12) United States Patent
Saleh et al.

(10) Patent No.: US 8,064,481 B2
(45) Date of Patent: *Nov. 22, 2011

(54) VIRTUAL PATH RESTORATION SCHEME USING FAST DYNAMIC MESH RESTORATION IN AN OPTICAL NETWORK

(75) Inventors: Ali N. Saleh, Ft. Lauderdale, FL (US); H. Michael Zadikian, McKinney, TX (US); Zareh Baghdasarian, Richardson, TX (US); Vahid Parsi, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/131,715

(22) Filed: Jun. 2, 2008

(65) Prior Publication Data

US 2008/0225696 A1    Sep. 18, 2008

Related U.S. Application Data

(63) Continuation of application No. 09/750,668, filed on Dec. 29, 2000, now Pat. No. 7,502,313, which is a continuation-in-part of application No. 09/232,397, filed on Jan. 15, 1999, now Pat. No. 6,856,627.

(60) Provisional application No. 60/137,472, filed on Jun. 4, 1999.

(51) Int. Cl.
*H04L 12/28* (2006.01)
*H04J 3/16* (2006.01)
*G01R 31/08* (2006.01)

(52) U.S. Cl. .......... 370/468; 370/396; 370/216
(58) Field of Classification Search .......... 370/392, 370/468, 400, 395.21, 396, 397, 398, 399, 370/395.2, 216, 218, 225, 227, 238, 236; 709/226, 225, 227; 398/1, 10, 12, 17, 45, 398/118, 123
See application file for complete search history.

(56) References Cited

U.S. PATENT DOCUMENTS

| | | | | |
|---|---|---|---|---|
| 5,065,399 A * | 11/1991 | Hasegawa et al. | ................ | 714/4 |
| 5,495,471 A * | 2/1996 | Chow et al. | ................ | 370/221 |
| 6,314,464 B1 * | 11/2001 | Murata et al. | ................ | 709/226 |
| 6,856,627 B2 * | 2/2005 | Saleh et al. | ................ | 370/397 |
| 7,502,313 B2 * | 3/2009 | Saleh et al. | ................ | 370/216 |

* cited by examiner

*Primary Examiner* — Hanh Nguyen
(74) *Attorney, Agent, or Firm* — Campbell Stephenson LLP

(57) ABSTRACT

A method for restoring a virtual path, provisioned between a source and a target node, in a mesh zoned optical network is described. The method, in one embodiment, broadcasts or floods restore path requests in the network to expedite the identification of an alternate route and minimize the service disruption for failed virtual path. The flooding of requests is controlled to ensure efficient performance of the network yet guaranteeing minimum restoration time to allow critical telecommunication related traffic to flow through the network with virtually no interruption. The constant update of nodal topology by each node allows a fast identification of alternate physical path for failed virtual path.

20 Claims, 16 Drawing Sheets

VIRTUAL PATH RESTORATION SCHEME USING FAST DYNAMIC MESH RESTORATION IN AN OPTICAL NETWORK

CROSS-REFERENCES TO RELATED APPLICATIONS

This application is a Continuation of patent application Ser. No. 09/750,668, filed Dec. 29, 2000 now U.S. Pat. No. 7,502,313 and entitled "A VIRTUAL PATH RESTORATION SCHEME USING FAST DYNAMIC MESH RESTORATION IN AN OPTICAL NETWORK," having A. N. Saleh, H. M. Zadikian, Z. Baghdasarian, and V. Parsi as inventors, which is a Continuation-in-Part of patent application Ser. No. 09/232,397, filed Jan. 15, 1999 now U.S. Pat. No. 6,856,627 and entitled "A METHOD FOR ROUTING INFORMATION OVER A NETWORK," having A. N. Saleh, H. M. Zadikian, Z. Baghdasarian, and V. Parsi as inventors. These applications are assigned to Cisco Technology, Inc., the assignee of the present invention, and are hereby incorporated by reference, in their entirety and for all purposes.

This application is also related to following applications:
1. Patent Application Ser. No. 60/137,472, entitled "A NETWORK ADDRESSING SCHEME FOR REDUCING PROTOCOL OVERHEAD IN AN OPTICAL NETWORK", filed Jun. 4, 1999 and having S. N. Ali and S. E. Plote as inventors.
2. Patent application Ser. No. 09/232,395, entitled "A CONFIGURABLE NETWORK ROUTER,", filed Jan. 15, 1999 and having H. M. Zadikian, A. N. Saleh, J. C. Adler, Z. Baghdasarian, and V. Parsi as inventors.

Above mentioned applications are assigned to Cisco Technology, Inc., the assignee of the present invention, and are hereby incorporated by reference, in their entirety and for all purposes.

BACKGROUND OF THE INVENTION

1. Field of the Invention

This invention relates to the field of information networks, and more particularly relates to a protocol for configuring and restoring routes over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g. 50% or more) of the network's available bandwidth for use in restoring failed circuits. However, ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum in order to make the maximum amount of bandwidth available for use by customers.

An alternative to the ring topology, the mesh topology reduces the amount of bandwidth needed for protection. The mesh topology is a point-to-point topology, with each node in the network connected to one or more other nodes. Because a circuit may be routed through various combinations of the network's nodes and over the various links which connect them, excess capacity through a given node or over a given link can serve to protect several circuits. However, the restoration of a circuit following a failure in a mesh topology can consume a relatively large amount of time.

SUMMARY

In one embodiment, the present invention reduces the time and resources required to restore a failed virtual path in a mesh optical network by broadcasting or 'constrained flooding' of restore path request packets in the network. This carefully controlled 'flooding' of restore path request packets quickly identifies multiple alternate paths for failed virtual path thus allowing network to guarantee fast restoration time required for many telecommunication related connections.

In another embodiment, in case of a link port failure, the restoration is localized to the node where link port failure occurred. If a link port failure occurs between two adjacent nodes then localization is effected through restoration by the two adjacent nodes without the resource utilization of any other node or the network The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Network Architecture

To limit the size of the topology database used by some protocols, and to limit the scope of broadcast packets (e.g., packets used for restoration), the nodes of a network can be divided into logical groups, referred to herein as "zones." The use of zones provides several benefits. Networks employing zones can be implemented in several different ways, some of which can be implemented concurrently.

Figure 1:
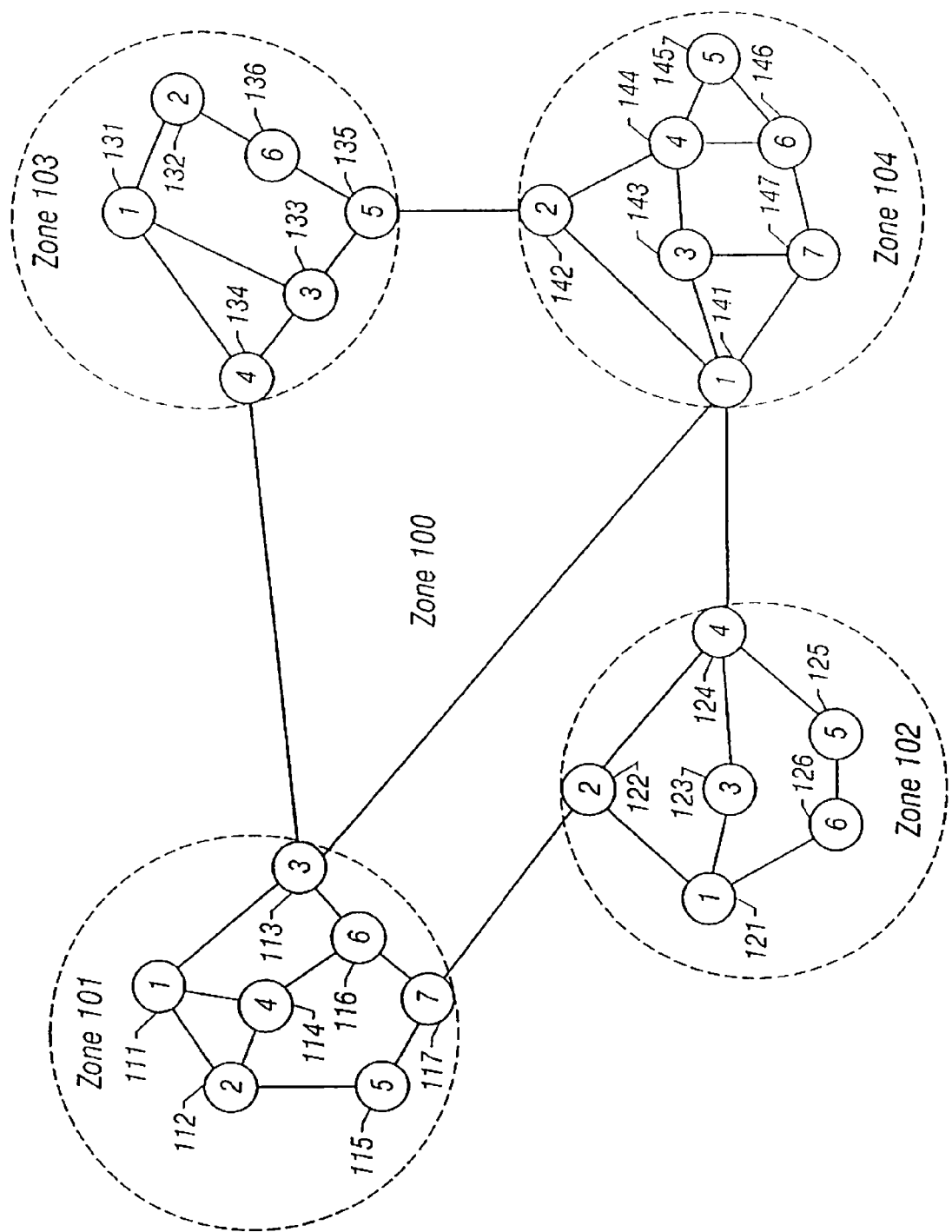
FIG. 1 is a block diagram of a zoned network consisting of four zones and a backbone.

FIG. 1 illustrates an exemplary network that has been organized into a backbone, zone 100, and four configured zones, zones 101-104, which are numbered 0-4 under the protocol, respectively. The exemplary network employs a type 0 node ID, as there are relatively few zones (4). The solid circles in each zone represent network nodes, while the numbers within the circles represent node addresses, and include network nodes 111-117, 121-126, 131-136, and 141-147. The dashed circles represent network zones. The network depicted in FIG. 1 has four configured zones (zones 101-104 (addressed as zones 1-4) and one backbone (zone 100 (addressed as zone 0)). Nodes with node IDs 1.3, 1.7, 2.2, 2,4, 3.4, 3.5, 4.1, and 4.2 (network nodes 113, 117, 122, 124, 134, 135, 141, and 142, respectively) are boundary nodes because they connect to more than one zone. All other nodes are interior nodes because their links attach only to nodes within the same zone. Zone 100 consists of 4 nodes, zones 101-104, with node IDs of 0.1, 0.2, 0.3, and 0.4, respectively.

Another example of the use of zone boundaries is in the provisioning and restoration of circuits within the network. Zone boundaries can be used to limit the flow of information generated by certain nodes during such provisioning and restoration. For example, a node can act as a proxy node for the source or destination node. In the event of a failure in the network affecting the circuit between the two nodes, the proxy node can perform source or destination node related functions. In the case of a failure, a node at the boundary of the zone, in which the failure has occurred, acts as a proxy for the source (or destination) node in the other zone. This avoids the need to involve the portion of the network circuit lying outside of the zone experiencing a failure, which would be expected to remain unchanged.

Another example of localized restoration is the use of the nodes where the physical port failure between two adjacent nodes has occurred. Upon discovering port failure, the two adjacent nodes restore the virtual path without the involvement of any other node or the network as long as there are sufficient ports available to restore failed link.

Initialization of Network Nodes

Once a network topology has been defined, the user can configure one or more end-to-end communication connections that can span multiple nodes and zones, an operation that is referred to herein as provisioning. Each set of physical connections that are provisioned creates an end-to-end communication connection between the two end nodes that supports a virtual point-to-point link (referred to herein as a virtual path or VP). Each link comprises a plurality of physical port between two adjacent nodes. The resulting VP has an associated capacity and an operational state, among other attributes.

VPs are also assigned a class of service, which determines their relative priority for restoration within the network. This class of service (CoS) is used during failure recovery procedures to determine which VPs are to be restored first and what restoration scheme is associated with it.

With each VP is associated the notion of a Physical Instance. The first time that a VP is set up, the VP is assigned a Physical Instance of 1. Whenever a fully set up path for a VP has to be changed because of some failure, the Physical Instance is incremented by 1. The source node of VP maintains a field referred to as Physical Instance Identifier. This field is preferably included in restoration related and other configuration packets. Only the source node should be provided the ability to update this parameter of a VP. The first path of any VP that is successfully provisioned (as seen by the Source node) will typically have a Physical Instance identifier of 1. All future Path related messages (Restore_I, Restore-_Path and like) will preferably have the correct value of this identifier. If a new path is selected for this VP, the source node of the VP, which originates Restore Path Request packets, will increment this identifier by 1. As will be discussed subsequently, several Physical Instances of the same VP may temporarily exist in the network at any given time due to the distributed nature of path selection (and multiple failures) during dynamic restoration. Embodiments of the present invention ensures that only one instance survives.

Failure Detection, Propagation, and Restoration

Failure Detection and Propagation

In networks, failures are typically detected using the mechanisms provided by the underlying physical network. For example, when using a SONET network, a fiber cut on a given link results in a loss of signal (LOS) condition at the nodes connected by that link. The LOS condition propagates an Alarm Indication Signal (AIS) and Remote Defect Indication (RDI), and generates a LOS defect locally. The defect is upgraded to a failure 2.5 seconds later, which causes an alarm to be sent to the Operations System (OS) (per Bellcore's recommendations in GR-253 (GR-253: Synchronous Optical Network (SONET) Transport Systems, Common Generic Criteria, Issue 2 [Bellcore, December 1995], included herein by reference, in its entirety and for all purposes)). Preferably, when using SONET, the handling of the LOS condition follows Bellcore's recommendations in GR-253, which allows nodes to inter-operate, and co-exist, with other network equipment (NE) in the same network. A path restoration protocol is invoked as soon as the LOS defect is detected by the line card, which occurs 3 ms following the failure (a requirement under GR-253).

Under GR-253, downstream is in the direction of the failure, and upstream is opposite in direction to the failure. A defect in the direction from the source to the destination would therefore cause an AIS to be propagated upstream and an RDI to be propagated downstream. The arrival of the AIS at the node upstream from the failure causes the upstream node to send a similar alarm to its upstream neighbor and for that node to send an AIS to its own upstream neighbor. This continues from node to node until the AIS finally reaches the source node of the affected VP, or a proxy node if the source node is located in a different zone. Under GR-253, each node is allowed a maximum of 125 microseconds to forward the AIS upstream, which quickly propagates failures toward the source (or proxy) node.

Once a node detects a failure on one of its links, either through a local LOS defect or a received AIS indication, the node scans its VP table looking for entries for VPs that include the failed link and analyzes the mode of failure.

Failure Modes:

There can be many virtual path-related failure modes in a network depending upon the location of link failure in that network. Virtual path failure modes can be characterized as follows:

Neighbor or Link mode: In this mode, the failure occurs at any physical port of a link between two adjacent nodes. The scope of the notification and restoration messages is preferably limited to the two adjacent nodes that discover the failure. Restoration, in this case, is relatively fast because the restoration does not involve the resource of any other node in the network (including proxy or source node). The internodal physical path traversed by the VP also does not change.

Path mode: In this mode, path failures are much more broader than a physical port breakdown. This may include a failure of entire optical link or a node. The source and destination of the affected VPs are notified and potentially the entire network is involved in the restoration. This mode may involve more messaging and longer restoration time than the Link mode. However, it depends on the CoS of the VP that how fast the path will be restored. Restoration here will most likely change the path traversed by the VP.

Figure 2:
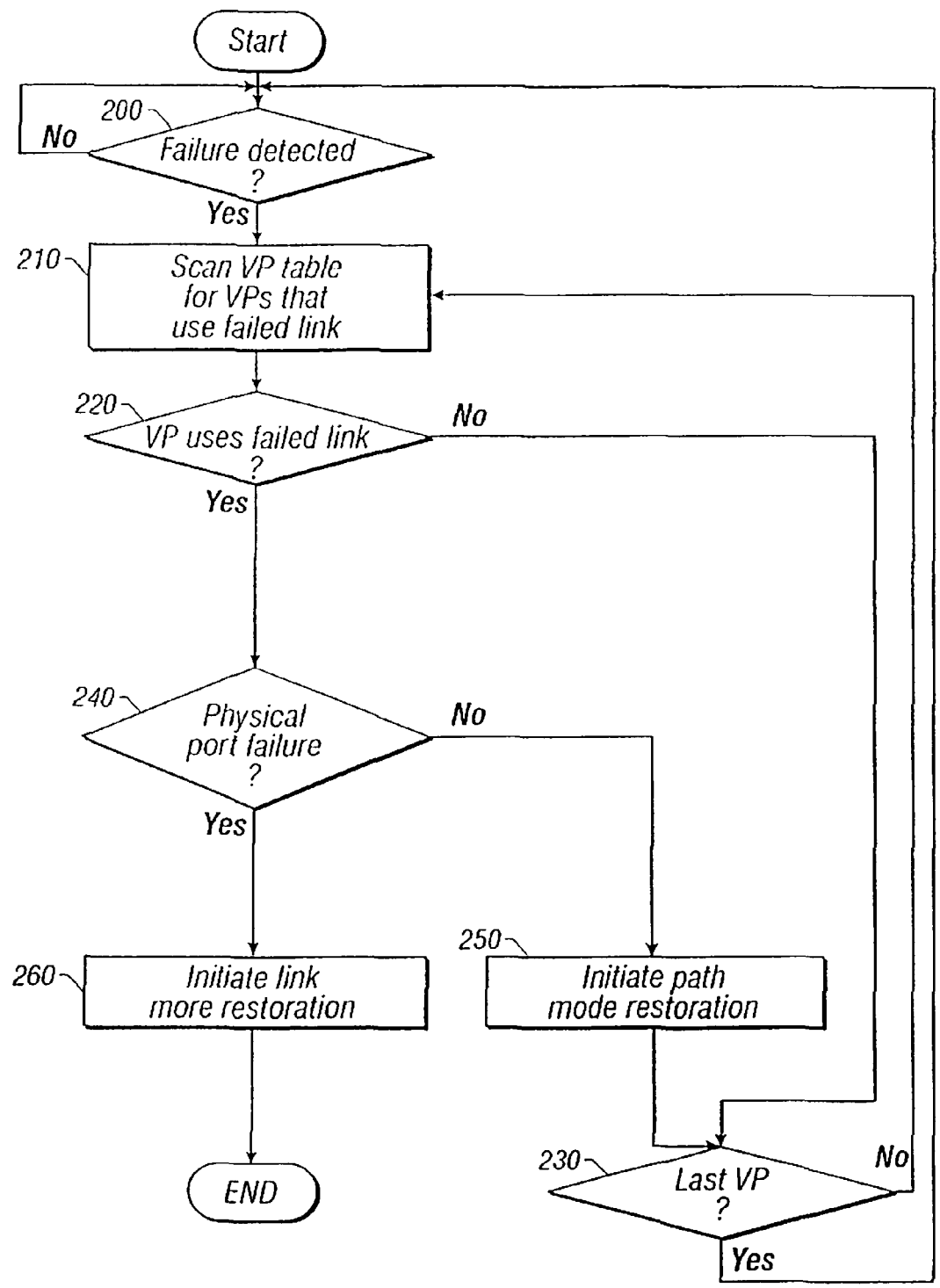
FIG. 2 is a flow diagram of broad general steps performed by a node for restoration in response to the failure of a virtual path.

Failure Restoration:

FIG. 2 is a flow diagram of broad general steps performed by a node for restoration in response to the failure of a virtual path. As noted, the failure of a link, results in a LOS condition at the nodes connected to the link and generates the appropriate AIS and RDI indications. If an AIS or RDI was received from a node, a failure has been detected (step 200). In that case, each affected node performs several actions in order to maintain accurate status information with regard to the VPs currently supported. The first action taken in such a case is that the node scans its VP table (step 210) looking for entries that have the failed link in their path (step 220). If the VP does not use the failed link, the node goes to the next VP in the table and begins analyzing that entry (step 230). If the selected VP uses the failed link, the node determines if the failure is a physical port failure (step 240). If the failure is a physical port failure then the node performs local link mode restoration (step 260). If the failure is not a physical port failure then the node initiates a path mode restoration for failed VP (step 250).

Figure 3A:
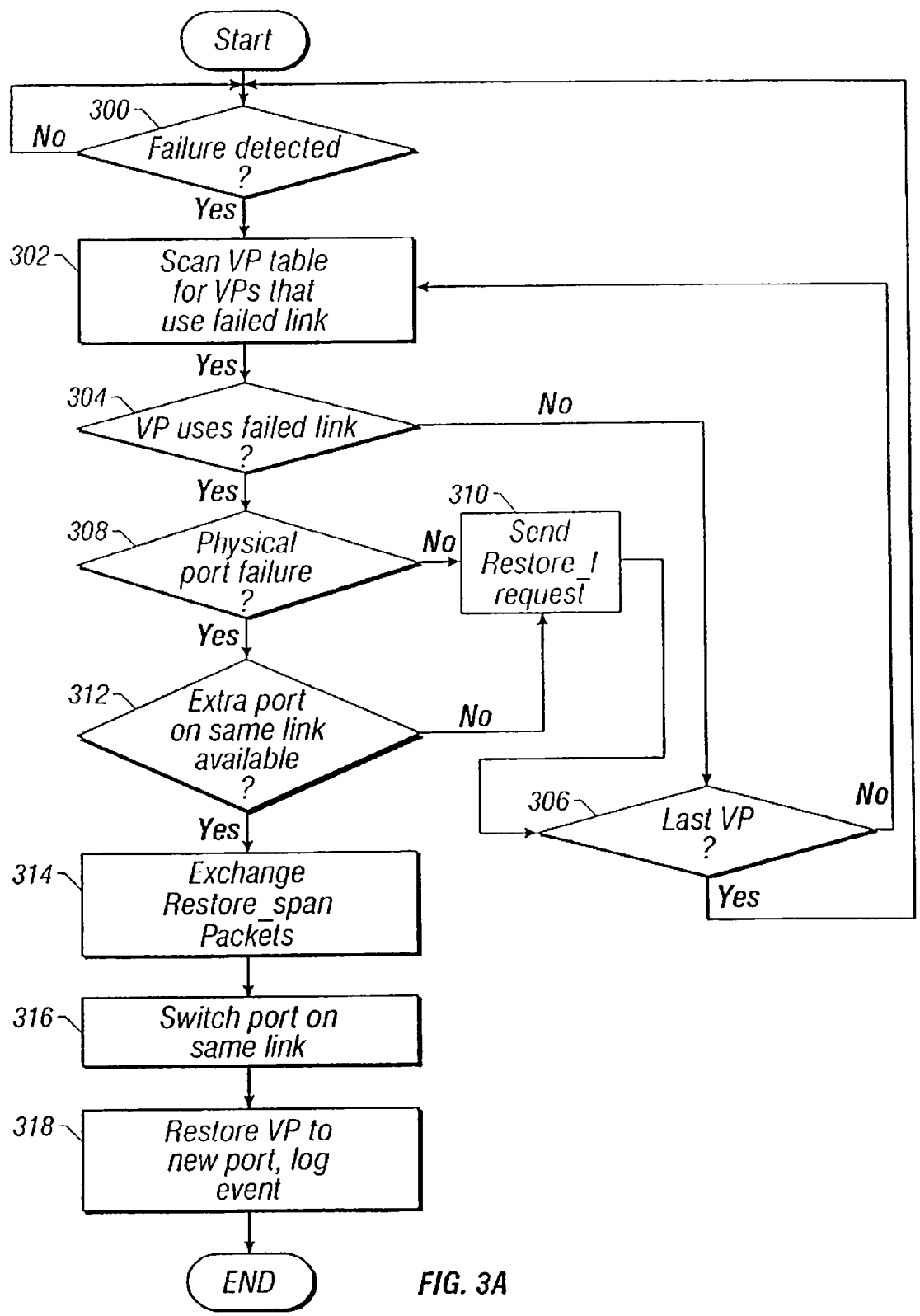
FIG. 3A is a flow diagram of steps performed in response to failure of a port on a link between two adjacent neighbor nodes.

Neighbor or Link mode restoration: FIG. 3A is a flow diagram of steps performed in response to the failure of a port on a link between two adjacent neighbor nodes. Link mode notification and restoration is achieved by means of exchanging a Restore Span packet. The Link mode failure messages may be likened to SONET APS except for the fact that the contents of link mode messages are much richer and thus gives more flexibility and resilience to multiple failures during the restoration procedure.

Once a node detects a failure on one of its active ports (step 300), either through a local loss of signal defect or a received error indication, the node scans the VP table (step 302) and checks to see if the port is in use by a VP (step 304). Further action depends upon the type of VP i.e. the associated CoS. If the port is not assigned to any VP, no action is taken and the node proceeds to next VP in the table (step 306). If the failed port is used by a VP, which requires restoration then the node that detected the failure, determines if the failure is physical port failure (step 308). If the failure is not local, the node initiates path restoration by initiating a Restore_I request (step 310).

If the failure is a physical port failure, the node first determines if extra ports are available within the same link (step 312). If extra ports are not available then the node initiates path restoration request (step 310). Once an extra physical port is identified, the node initiates a Restore Span request (step 314), switches the port (step 316) and logs event in node database (step 318).

Figure 3B:
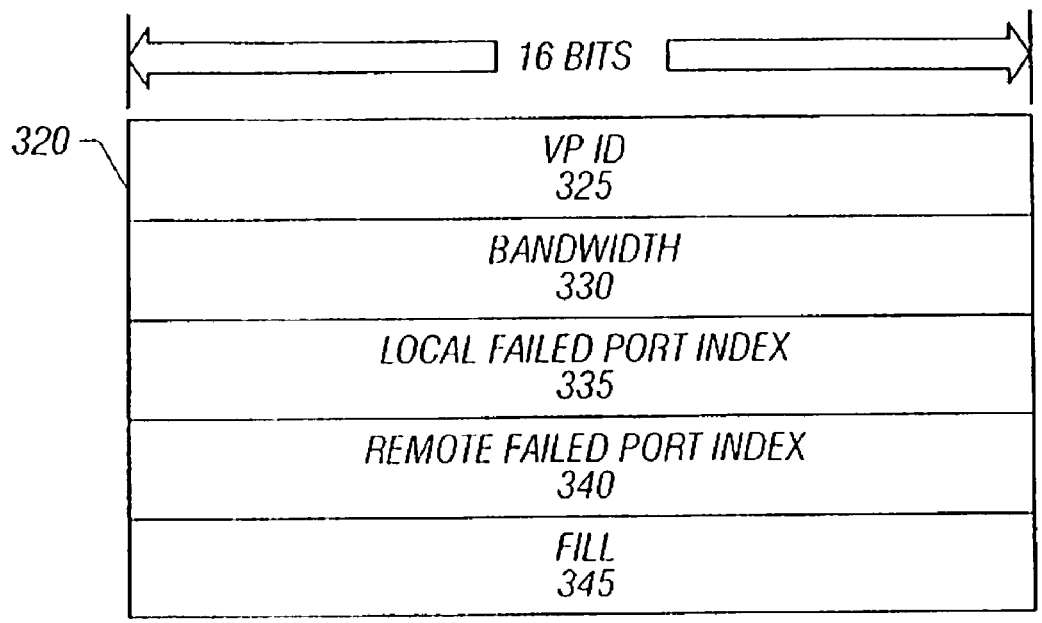
FIG. 3B illustrates an example of a Restore Span packet.

FIG. 3B illustrates an example of a Restore Span packet. The Restore Span packet (320) is used to restore a VP from port or fiber failures locally. Restore Span packet contains the Identification of VP being restored (325) and the total bandwidth required to restore VP (330). The Index of failed port on Master node (335) identifies the port that failed and the Index of failed port on Slave node (340) identifies the port on slave side. A Fill field (345) is provided for slave node to provide an index of suggested port to replace the failed port on Master node.

The Restore Span requests are preferably generated by the master node and replied to by the slave node on the link. This allows traffic from one or more ports to be switched to other unused ports on the same link. One advantage of using this procedure is that the process only involves two nodes and preserves the resources of other nodes in the network (including source and destination). After receiving a Restore Span packet, the slave node responses with a Restore Span response packet.

Figure 3C:
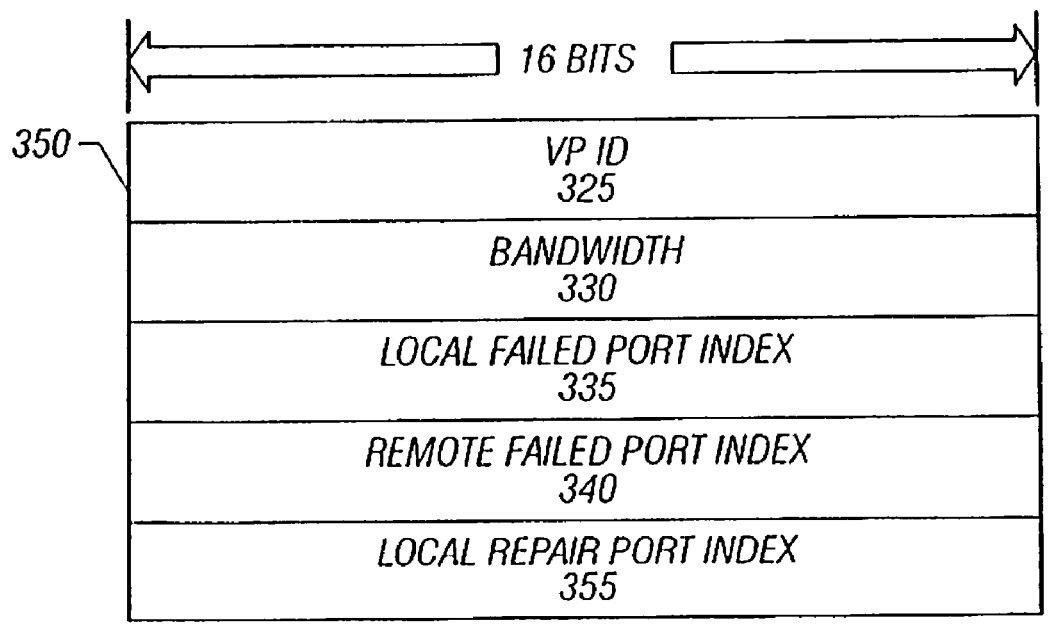
FIG. 3C illustrates an example of a Restore Span Response packet.

FIG. 3C illustrates an example of a Restore Span Response packet which is identical to Restore Span request packet. In the Restore Span Response packet (350), the slave node provides an index (355) of suggested port to replace failed port of VP. This operation does not involve any other nodes or the network. The path is restored without the interruption of service on the virtual path.

If the failure is more serious than just a simple port failure i.e. an entire link is down (and no port is active) then the failure affects all the traffic on failed link. In this case, the network goes into path mode restoration.

Path mode restoration: If local Link mode restoration fails or entire link is down then the node which discovers the failure creates and sends out a Restore_I packet. Restore_I packets are path messages in that they are sent down the same path as the VP that traversed the failed link.

Figure 3D:
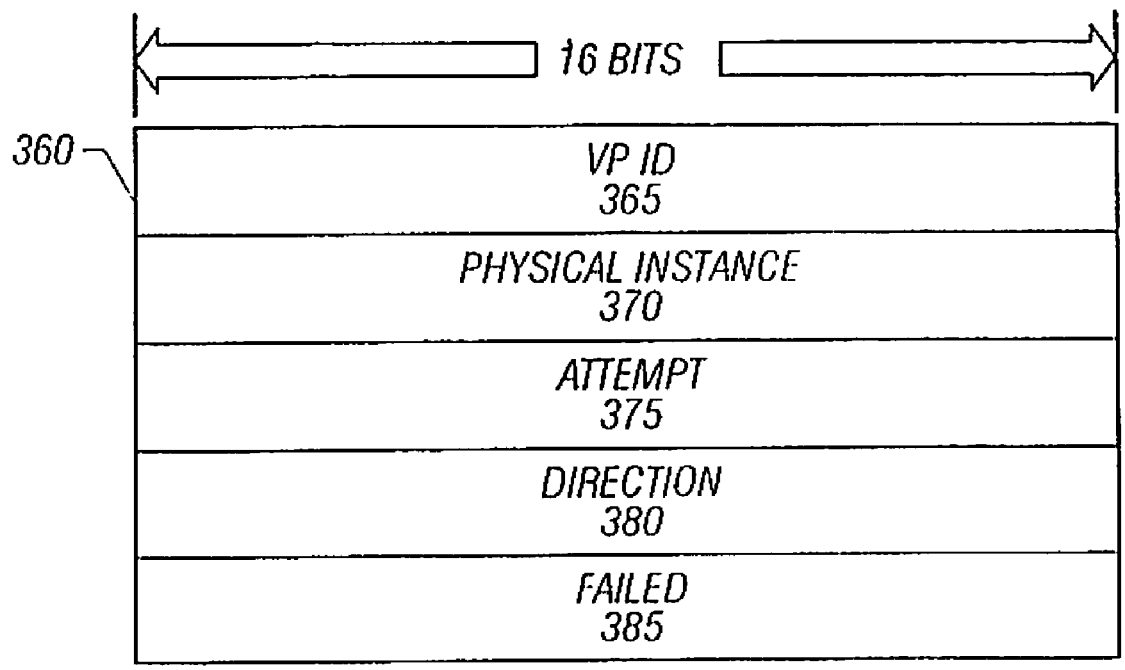
FIG. 3D illustrates an example of a Restore_I packet.

FIG. 3D illustrates an example of a Restore_I packet. The Restore_I packet (360) contains the Identification of failed VP (365), Physical Instance Identification of the VP (370) that the node originating the Restore_I packet has and the attempt count of the current physical instance of the Virtual Path (375). The Restore_I packet also contains the direction of the failure (380). The direction field indicates whether the failure occurred on the UPSTREAM (towards the Source of the VP) or DOWNSTREAM (towards Destination) side of the node. The failed path field (385) indicates whether the path is the Primary or Secondary path for CoS-3. For all other types of VPs, this field indicates that failed path is the primary path for failed VP.

Initiating Restore_I Request: The node that discovers the failure transmits Restore_I packets both upstream and downstream. The source of the VP only transmits them downstream. After transmitting packet, the source node immediately starts restoration process. The destination node sends packets upstream and after sending these packets, the node starts a timer for acknowledgement and retransmission.

The intermediate or tandem node attempt to send packets in both directions even in the case that there is no transmission path in one of the directions. Restore_I packet transmissions are reliable and preferably are acknowledged by the receiving node (the neighbor of the initiating node). A timer is started for each Restore_I request that is sent. The request is resent periodically until a response is received or a threshold for the number of unacknowledged packets sent is reached. In either case, if an acknowledgment is received or the threshold is reached, then all resources associated with the VP are released. In the case of multiple port failure in the same VP, even if Restore_I messages are sent out regarding the failure of the first port in a VP, upon subsequent failures, similar procedure is carried out. FIG. 3C illustrates a format of the Restore_I message.

Receiving Restore_I Request: Upon receiving a Restore_I packet, certain tests are performed. A node should examine the VP ID and return a NAK (with a reason code of NULL_VP) if this VP doesn't exist at the node. For VP with a lower CoS, the state of the VP and Path is changed to DOWN. When source node of a lower CoS VP receives a Restore_I packet, then the source node will generate an alarm. For VPs with a CoS requiring Dynamic Mesh Restoration, if the receiving node is a tandem node, then the current Physical Instance (PI) of the VP at the node is compared to the PI in the Restore_I packet. If the stored PI at the node is higher than the one in the Restore_I packet, then a NAK (STALE_MSG) is returned (to the sending node). Otherwise, the Restore_I packet is accepted for processing. The state of the VP is changed to DOWN, if the state is not already set in that state. The Restore_I packet is then forwarded in the same direction as the incoming packet. A timer is initiated for retransmission and after certain predefined threshold times retransmissions, all the resources of VP are released.

If the receiving node is the Source node of the VP, the source node starts restoration and the state of path is set to RESTORING. If the receiving node is the destination node then all the resources associated with the VP are released and the node waits for messages from the Source to arrive. In all the cases (except when a NAK has to be returned), an ACK is returned to the node sending the packet.

Receiving a Restore_I Response: If the receiving node has already responded to Restore_I packet then responses to subsequent Restore_I packets are ignored if the Physical Instance of the VP in the response is lower than the node's current Physical Instance for that VP. For valid responses, the appropriate timer and retransmissions are stopped. If receiving node is tandem node and the response is positive and responses to all the packets sent out for that VP have been received, then the resources allocated to the VP are released.

For negative responses, the reason code is examined and if the number of retries is below a given threshold, the sending node resends the Restore_I packet. If this threshold has been exceeded, resources associated with the VP are released. Similarly, if the reason code is STALE_MSG (possibly because the responding node has already participated in the set up of a new restoration path for the VP and thus has a higher Physical Instance now), resources for the VP are released without any retransmissions.

Initiating Path Restoration:
Processing by Source/Proxy Node:
When the node receiving Restore_I packet is the source or proxy node of the VP then the node acknowledges the request packet and the VP is placed on a list of VPs to be restored. The state of VP is set to RESTORING and the node starts restoration process.

Figure 4A:
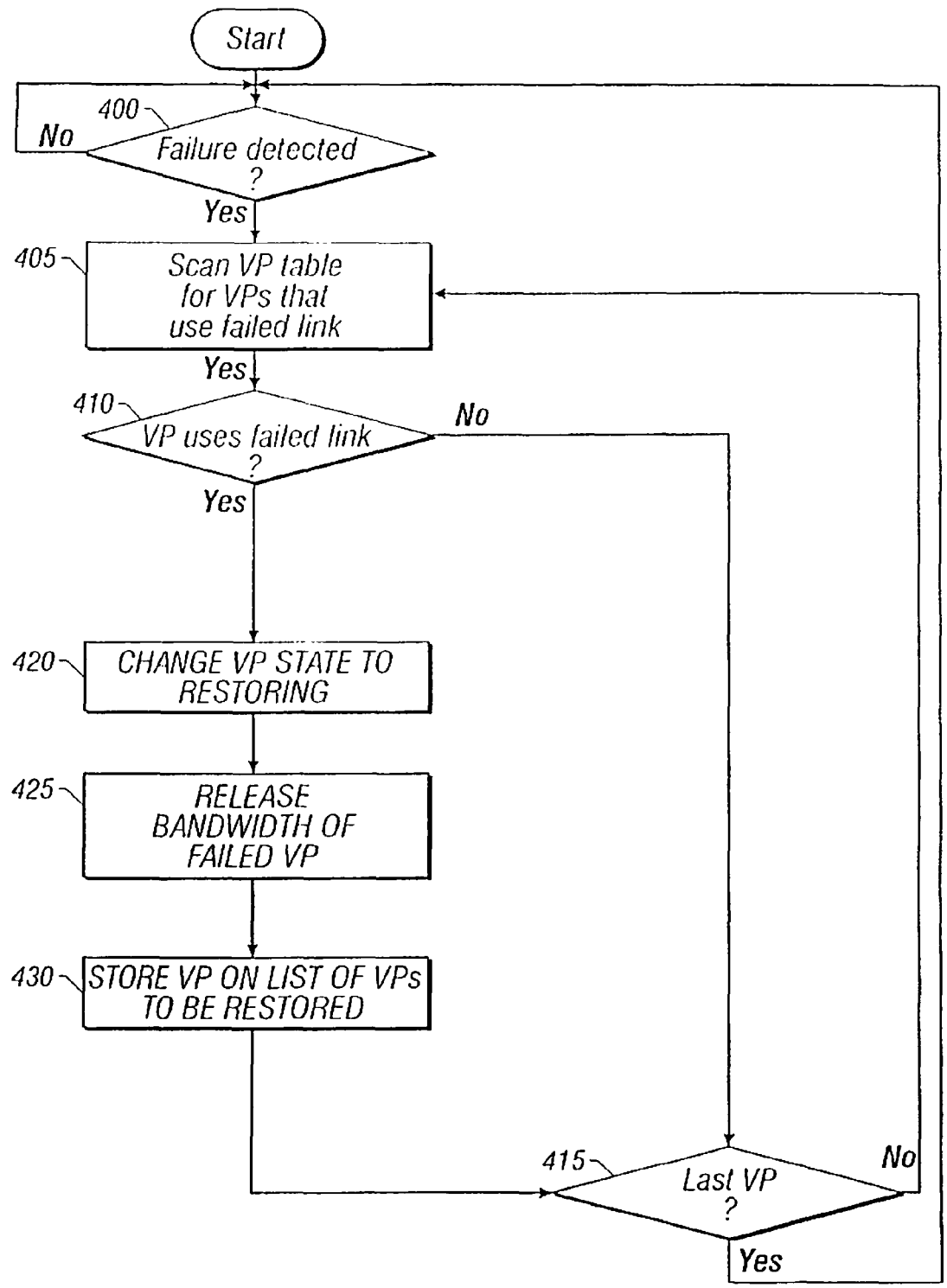
FIG. 4A is a flow diagram of general steps performed by a source or proxy node in response to the failure of a link.

FIG. 4A is a flow diagram of general steps performed by a source or proxy node in response to the failure of a link. As noted, the failure of a link results in a LOS condition at the nodes connected to the failed link and generates appropriate AIS and RDI indications. When an AIS or RDI message is received from a node, the message indicates detection of a failure (step 400). In that case, each affected node performs several actions in order to maintain accurate status information with regard to the VPs currently supported. The first action taken in such a case is that the node scans its VP table, looking for entries that have the failed link in their path (steps 405). Next, the node checks if the VP uses the failed link (step 410). If the VP does not use the failed link, the node goes to the next VP in the table (step 415). If the selected VP uses the failed link, the node changes VP's state to RESTORING (step 420) and releases all link bandwidth allocated to that VP (step 425). The node places VP on the list of VPs to be restored (step 430).

Next, the source or proxy node sends a Restore Path Request packet (RPR) to all eligible neighbors (i.e., a node adjacent to the given node) in order to restore the given VP. Neighbor eligibility is determined by the state of the neighbor, available link bandwidth, current zone topology, location of the target node, and other parameters.

Figure 4B:
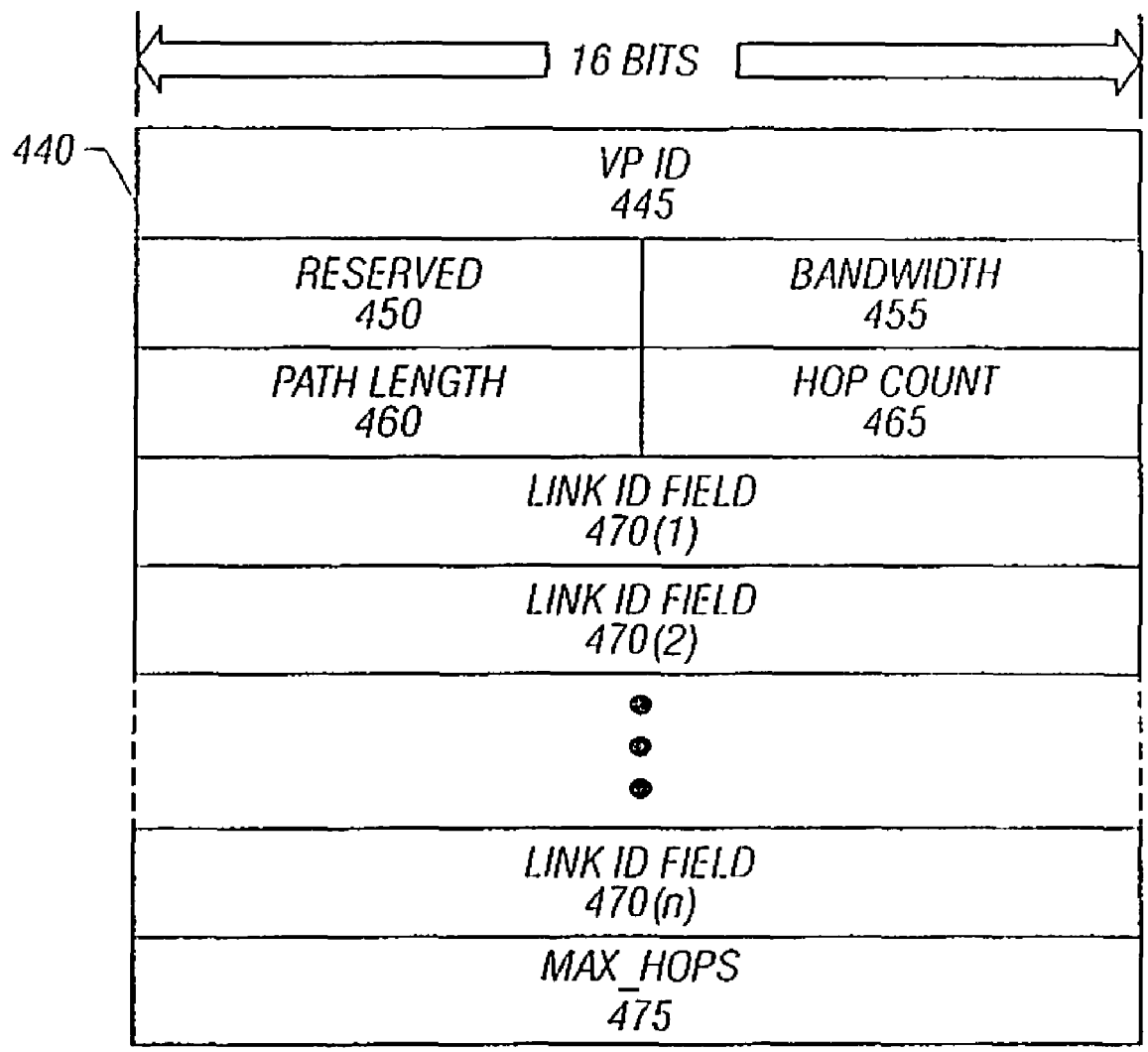
FIG. 4B illustrates an example of a Restore Path Request (RPR) packet.

The Restore Path Packet:
FIG. 4B illustrates an example of a Restore Path Request (RPR) packet. The Restore Path packet is sent by the source nodes (or proxy boundary nodes), to obtain an end-to-end path for a VP. The packet is usually sent during failure recovery procedures but can also be used for provisioning new VPs. The RPR packet (440) includes a virtual path identifier field (445) and a reserved flag field (450). The requested bandwidth for failed virtual path is indicated in bandwidth field (455). The Path Length field (460) indicates the number of links in the VP. This field determines how many Link IDs appear at the end of the packet. A HOP_COUNT field (465) is provided to determine the number of nodes the Restore Path Request packed has traveled. This field is set to 0 by the source node and is incremented at every node during the flooding procedure. An array of path lengths (470) is provided to identify the links used by each intermediary node to replace the failed VP. Each node that processes Restore Path Request will populate this field with the link used for VP restoration. MAX_HOP field (475) defines the maximum number of nodes to be included in the path.

The Processing of Received RPRs by Tandem Node
Due to the way RPR messages are forwarded by tandem nodes and the unconditional and periodic retransmission of such messages by origin nodes, multiple instances of the same request and even multiple copies of each instance, circulating in the network at any given time is not uncommon. To minimize the amount of broadcast traffic generated by the protocol and aid tandem nodes in allocating bandwidth fairly for competing RPRs, tandem nodes preferably executes a sequence such as that described subsequently.

The term "same instance," as used herein, refers to messages that carry the same VP ID, origin node ID and hop-count, and are received from the same tandem node (usually, the same input link, assuming only one link between nodes). Any two messages that meet the above criteria are guaranteed to have been sent by the same origin node, over the same link, to restore the same VP, and to have traversed the same path. The terms "copy of an instance," or more simply "copy" are used herein to refer to a retransmission of a given instance.

Normally, tandem nodes select the first instance they receive because in most, but not all cases, as the first RPR received normally represents the quickest path to the origin node. To keep track of all the requests, the node maintains RPR related information in a Restore Path Request Entry data structure.

The Restore-Path Request Entry (RPRE) is a data structure that maintains information about a specific instance of a RPR packet. Tandem nodes use the structure to store information about the request, which helps them identify and reject other instances of the request, and allows them to correlate received responses with forwarded requests. Table 1 lists an example of the fields that are preferably present in an RPRE. Other path relevant information can also be added to the structure.

TABLE 1

RPR Fields

| Field | Usage |
|---|---|
| Origin Node | The node ID of the node that originated this request. This is either the source node of the VP or a proxy node. |
| Target Node | Node ID of the target node of the restore path request. This is either the destination node of the VP or a proxy node. |
| Received From | The neighbor from which we received this message. |
| First Sequence Number | Sequence number of the first received copy of the corresponding restore-path request. |
| Last Sequence Number | Sequence number of the last received copy of the corresponding restore-path request. |
| Bandwidth | Requested bandwidth. |
| QoS | Requested QoS. |
| Timer | Used by the node to timeout the RPR. |
| T-Bit | Set to 1 when a Terminate indicator is received from any of the neighbors. |
| Pending Replies | Number of the neighbors that haven't acknowledged this message yet. |
| Sent To | A list of all neighbors that received a copy of this message. Each entry contains the following information about the neighbor: AckReceived: Indicates if a response has been received from this neighbor. F-Bit: Set to 1 when Flush indicator from this neighbor. |

When an RPR packet arrives at a tandem node, a decision is made as to which neighbor should receive a copy of the packet. The choice of neighbors is related to variables such as link capacity and distance. Specifically, a particular neighbor is selected to receive a copy of the packet if:

1. The output link has enough resources to satisfy the requested bandwidth.
2. The path through the neighbor is less than MAX_HOPS in length. In other words, the distance from this node to the target node is less than MAX_HOPS minus the distance from this node to the origin node.
3. The node hasn't returned a Flush response for this specific instance of the RPR, or a Terminate response for this or any other instance.

Figure 5A:
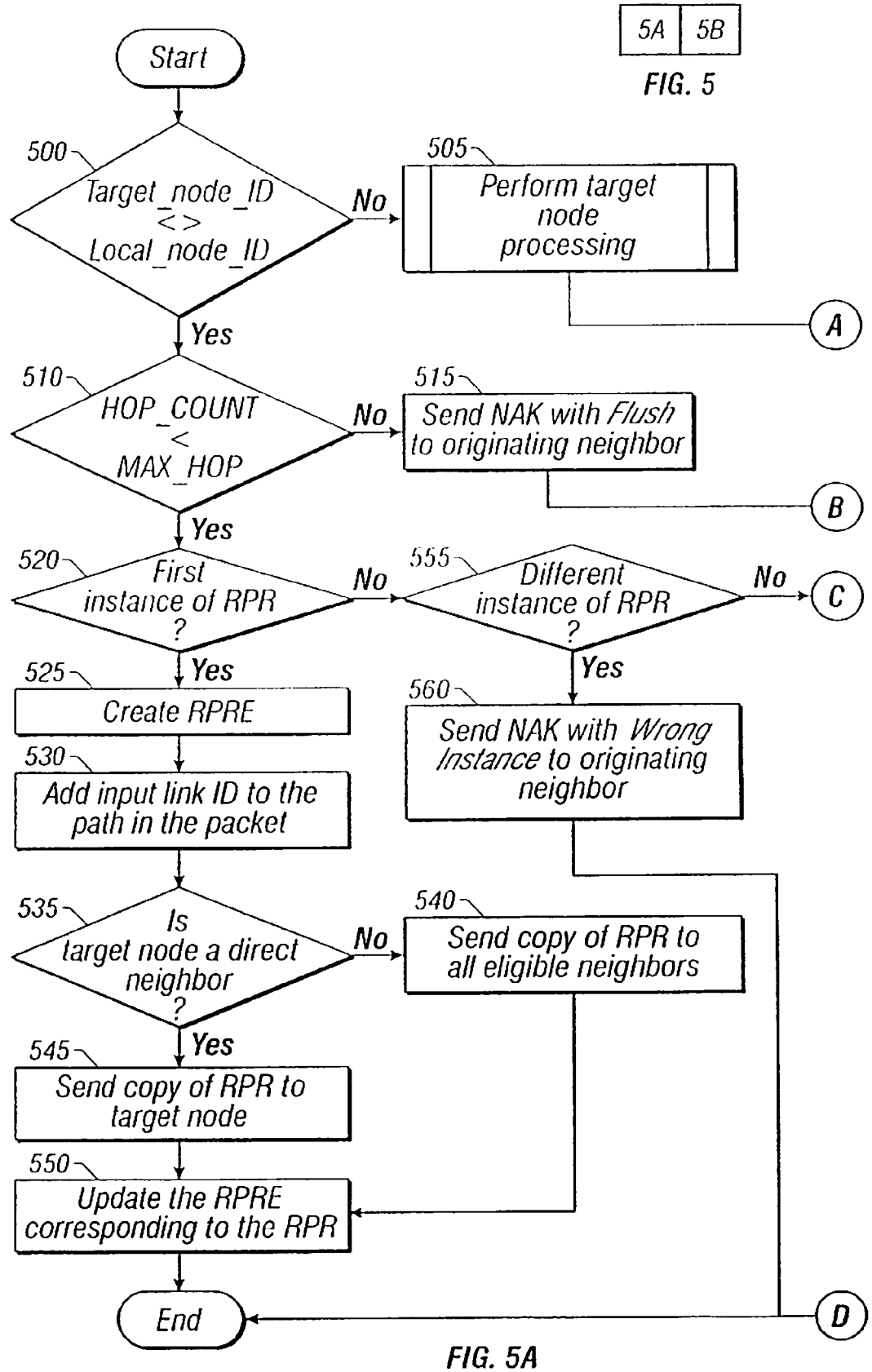
FIG. 5 illustrates the actions performed by tandem nodes in processing received RPR tests.
Figure 5B:
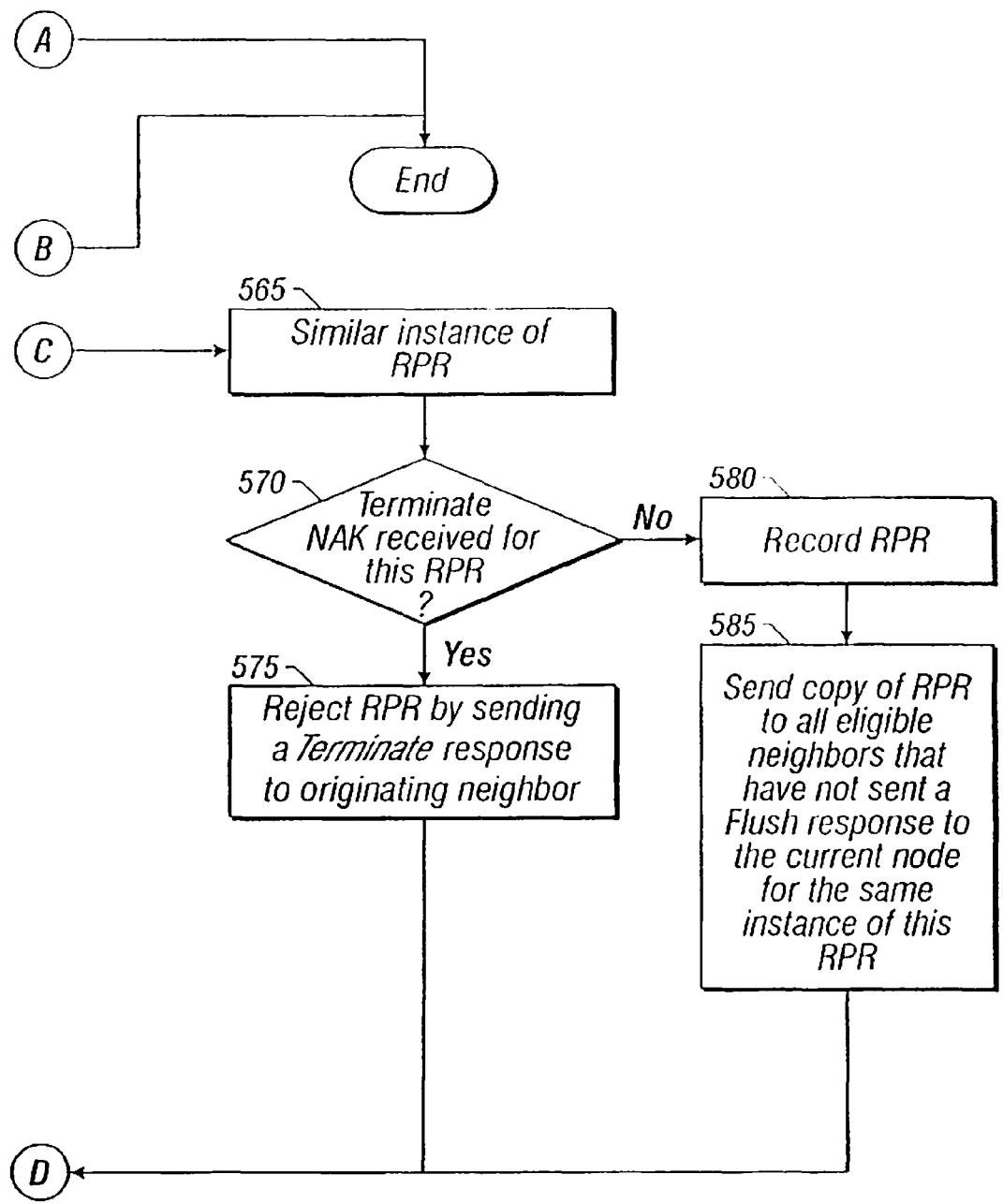

FIG. 5 illustrates the actions performed by tandem nodes in processing received RPR tests. Assuming that this is the first instance of the request, the node allocates the requested bandwidth on eligible links and transmits a modified copy of the received message onto them. The bandwidth remains allocated until a response (either positive or negative) is received from the neighboring node, or a positive response is received from any of the other neighbors (see Table 8 below). While awaiting a response from its neighbors, the node cannot use the allocated bandwidth to restore other VPs, regardless of their priority.

Processing of RPRs begins at step 500, in which the target node's ID is compared to the local node's ID. If the local node's ID is equal to the target node's ID, the local node is the target of the RPR and must process the RPR as such. This is illustrated in FIG. 5 as step 505 and is the subject of the flow diagram illustrated in FIG. 6. If the local node is not the target node, the RPR's HOP_COUNT is compared to MAX_HOP node in order to determine if the HOP_COUNT has exceeded or will exceed the maximum number of hops allowable (step 510). If this is the case, a negative acknowledgment (NAK) with a Flush indicator is then sent back to the originating node (step 515). If the HOP_COUNT is still within acceptable limits, the node then determines whether this is the first instance of the RPR having been received (step 520). If this is the case, a Restore-Path Request Entry (RPRE) is created for the request (step 525). This is done by creating the RPRE and setting the RPRE's fields, including starting a time-to-live (TTL) or deletion timer, in the following manner:

RPRE.SourceNode=Header.Origin
RPRE.Destination Node=Header.Target
RPRE.FirstSequence Number=Header.SequenceNumber
RPRE.Last Sequence Number=Header.Sequence Number
RPRE.QoS=Header.Parms.RestorePath.QoS
RPRE.Bandwidth=Header.Parms.RestorePath.Bandwidth
RPRE.ReceivedFrom=Node ID of the neighbor that sent us this message
StartTimer (RPRE.Timer, RPR_TTL)

The ID of the input link is then added to the path in the RPRE (e.g., Path[PathIndex++]=LinkID) (step 530). Next, the local node determines whether the target node is a direct neighbor (step 535). If the target node is not a direct neighbor of the local node, a copy of the (modified) RPR is sent to all eligible neighbors (step 540). The PendingReplies and SentTo Fields of the corresponding RPRE are also updated. If the target node is a direct neighbor of the local node, the RPR is sent only to the target node (step 545). In either case, the RPRE corresponding to the given RPR is then updated (step 550).

If this is not the first instance of the RPR received by the node, the node then attempts to determine whether this might be a different instance of the RPR (step 555). A request is considered to be a different instance if the RPR:

1. Carries the same origin node IDs in its header;
2. Specifies the same VP ID; and
3. Was either received from a different neighbor or has a different HOP_COUNT in its header.

If this is simply a different instance of the RPR, and another instance of the same RPR has been processed, and accepted, by this node, a NAK Wrong Instance is sent to the originating neighbor (step 560). The response follows the reverse of the path carried in the packet. No broadcasting is therefore necessary in such a case. If a similar instance of the RPR has been processed and accepted by this node (step 565), the node then determines whether a Terminate NAK has been received for this RPR (step 570). If a Terminate NAK has been received for this RPR, the RPR is rejected by sending a Terminate response to the originating neighbor (step 575). If a Terminate NAK was not received for this RPR, the new sequence number is recorded (step 580) and a copy of the RPR is forwarded to all eligible neighbors that have not sent a Flush response to the local node for the same instance of this RPR (step 585). This may include nodes that weren't previously considered by this node due to conflicts with other VPs, but does not include nodes from which a Flush response has already been received for the same instance of this RPR. The node then saves the number of sent requests in the PendingReplies field of the corresponding RPRE. The term "eligible neighbors"

refers to all adjacent nodes that are connected through links that meet the link-eligibility requirements previously described. Preferably, bandwidth is allocated only once for each request so that subsequent transmissions of the request do not consume any bandwidth.

Note that the bandwidth allocated for a given RPR is released differently depending on the type of response received by the node and the setting of the Flush and Terminate indicators in its header. Table 2 shows the action taken by a tandem node upon receiving a restore path response from a neighbor.

TABLE 2

Actions taken by a tandem node upon receiving an RPR.

| Response Type | Flush Indicator? | Terminate Indicator? | Received Sequence Number | Action |
|---|---|---|---|---|
| X | X | X | Not Valid | Ignore response |
| Negative | No | No | 1 = Last | Ignore response |
| Negative | X | No | =Last | Release bandwidth allocated for the VP on the link on which the response was received. |
| Negative | Yes | No | Valid | Release bandwidth allocated for the VP on the link on which the response was received. |
| Negative | X | Yes | Valid | Release all bandwidth allocated for the VP. |
| Positive | X | X | Valid | Commit bandwidth allocated for the VP on the link the response was received on; release all other bandwidth. |

The Processing of Received RPRs by Destination or Target Node

Figure 6:
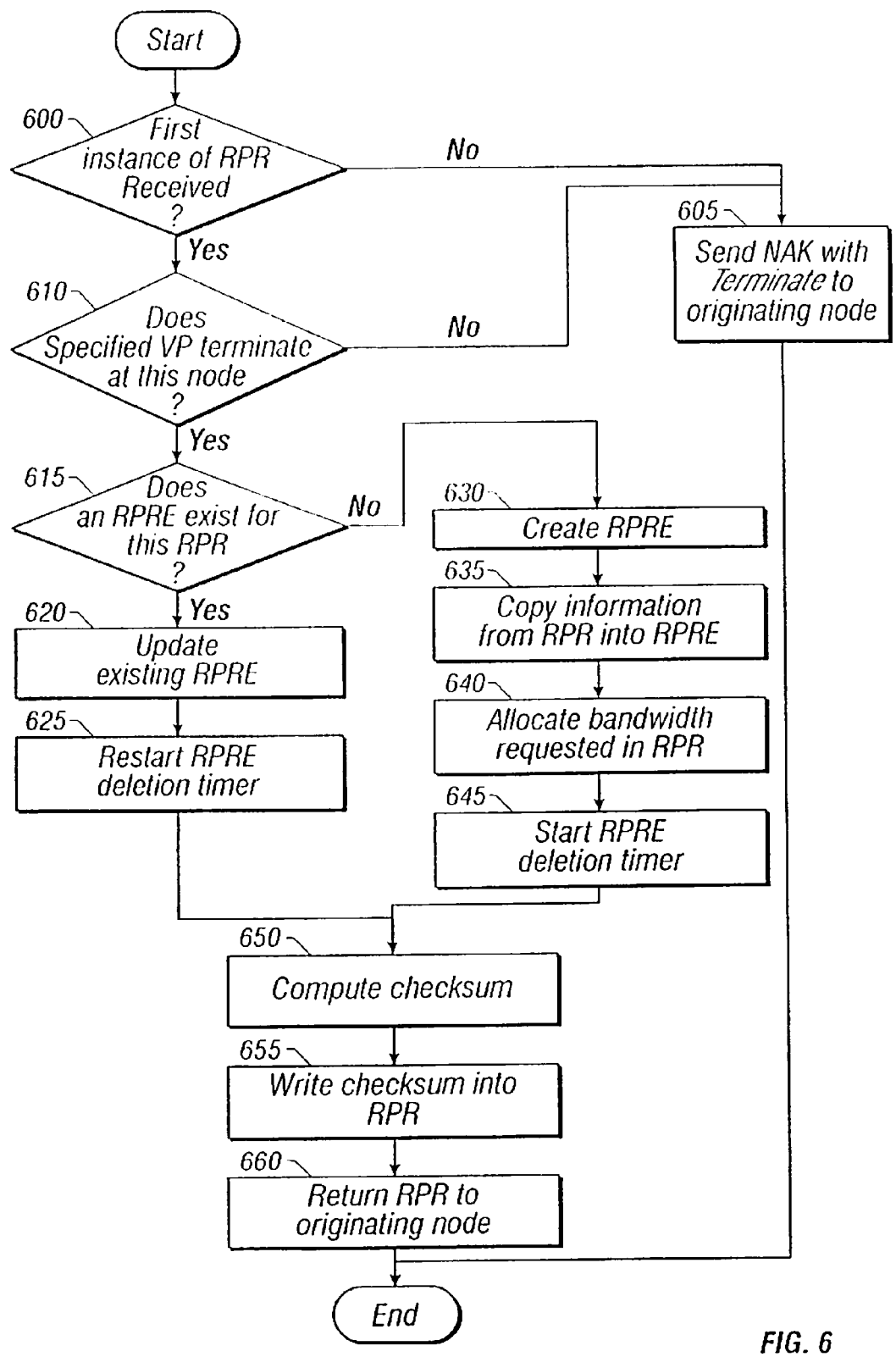
FIG. 6 illustrates the process performed at the target node once the RPR finally reaches that node.

FIG. 6 illustrates the process performed at the target node once the RPR finally reaches that node. When the RPR reaches its designated target node, the target node begins processing of the RPR by first determining whether this is the first instance of this RPR that has been received (step 600). If that is not the case, a NAK is sent with a Terminate indicator sent to the originating node (step 605). If this is the first instance of the RPR received, the target node determines whether or not the VP specified in the RPR actually terminates at this node (step 610). If the VP does not terminate at this node, the target node again sends a NAK with a Terminate to the originating node (step 605). By sending a NAK with a Terminate indicator, resources allocated along the path are freed by the corresponding tandem nodes.

If the VP specified in the RPR terminates at this node (i.e. this node is indeed the target node), the target node determines whether an RPRE exists for the RPR received (step 615). If an RPRE already exists for this RPR, the existing RPRE is updated (e.g., the RPRE's LastSequenceNumber field is updated) (step 620) and the RPRE deletion timer is restarted (step 625). If no RPRE exists for this RPR in the target node (i.e., if this is the first copy of the instance received), an RPRE is created (step 630). Pertinent information from the RPR is copied into the RPRE (step 635), the bandwidth requested in the RPR is allocated on the input link by the target node (step 640) and an RPRE deletion timer is started (step 645). In either case, once the RPRE is either updated or created, a checksum is computed for the RPR (step 650) and written into the checksum field of the RPR (step 655). The RPR is then returned as a positive response to the origin node (step 660). The local (target) node then initiates its own matrix configuration. It will be noted that the RPRE created is not strictly necessary but helps to ensure that the processing of RPRs is consistent across nodes.

Figure 7A:
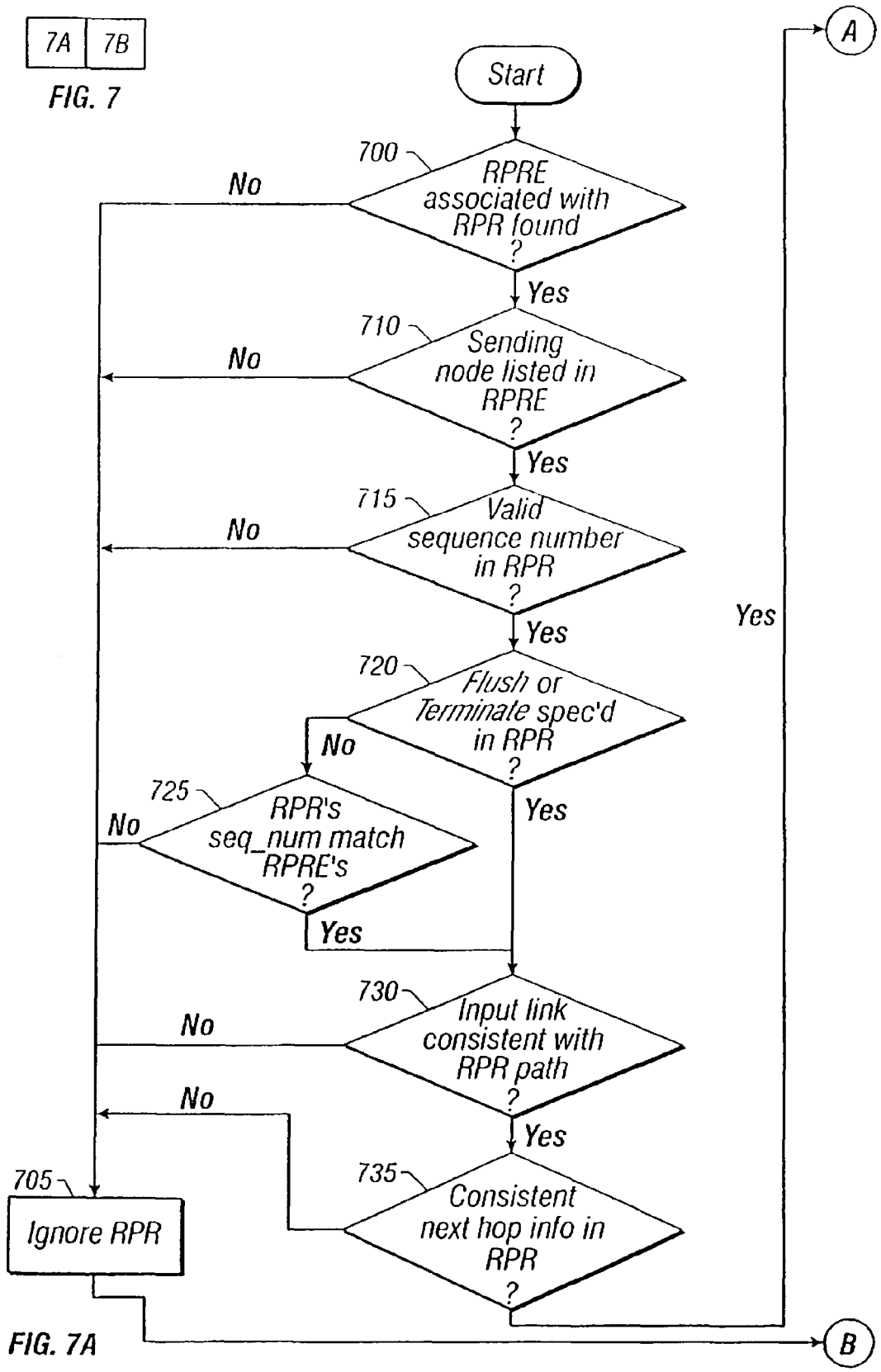
FIG. 7 Is a flow diagrams illustrating the processes performed by originating nodes that receive negative RPR responses.
Figure 7B:
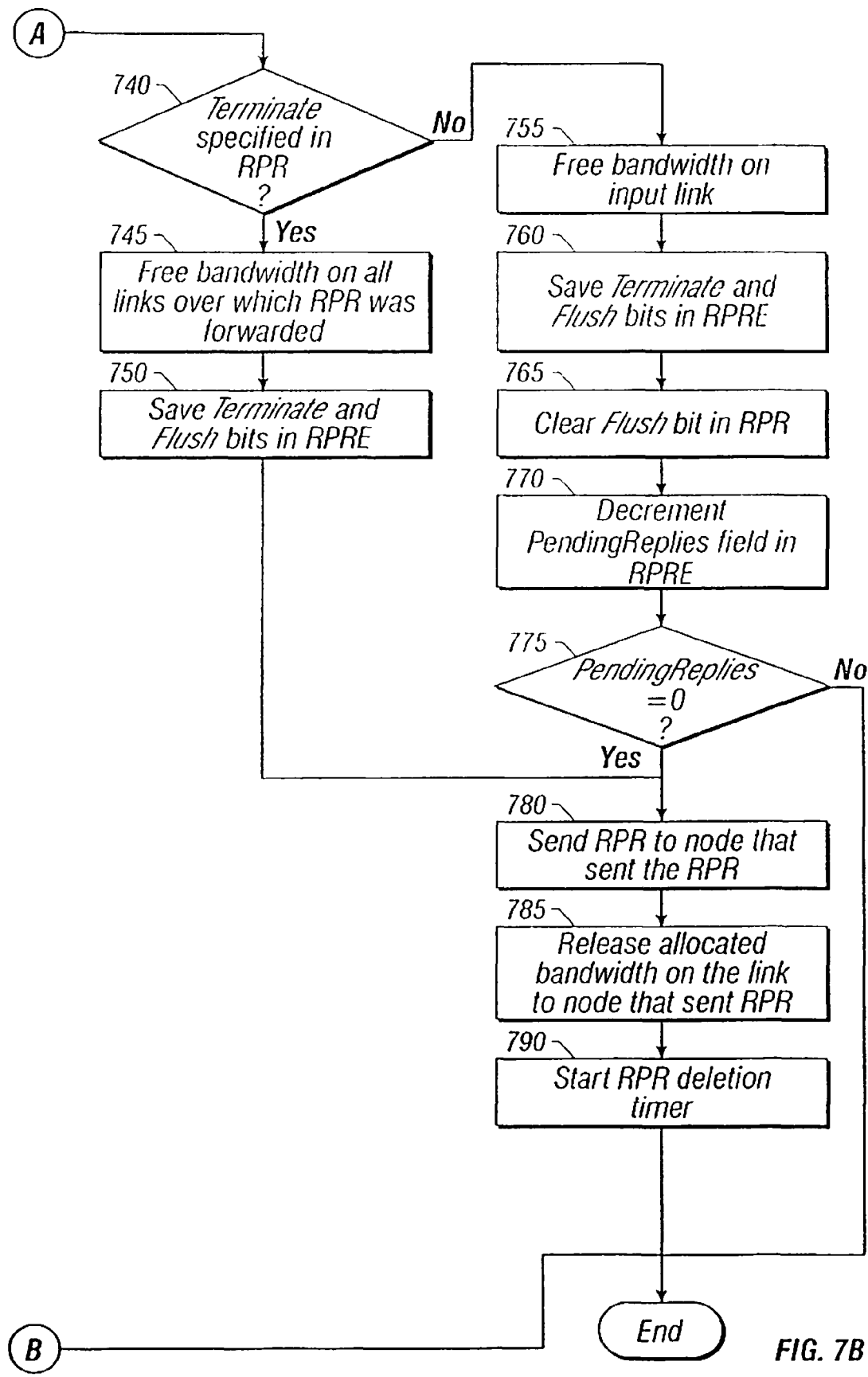
Figure 8:
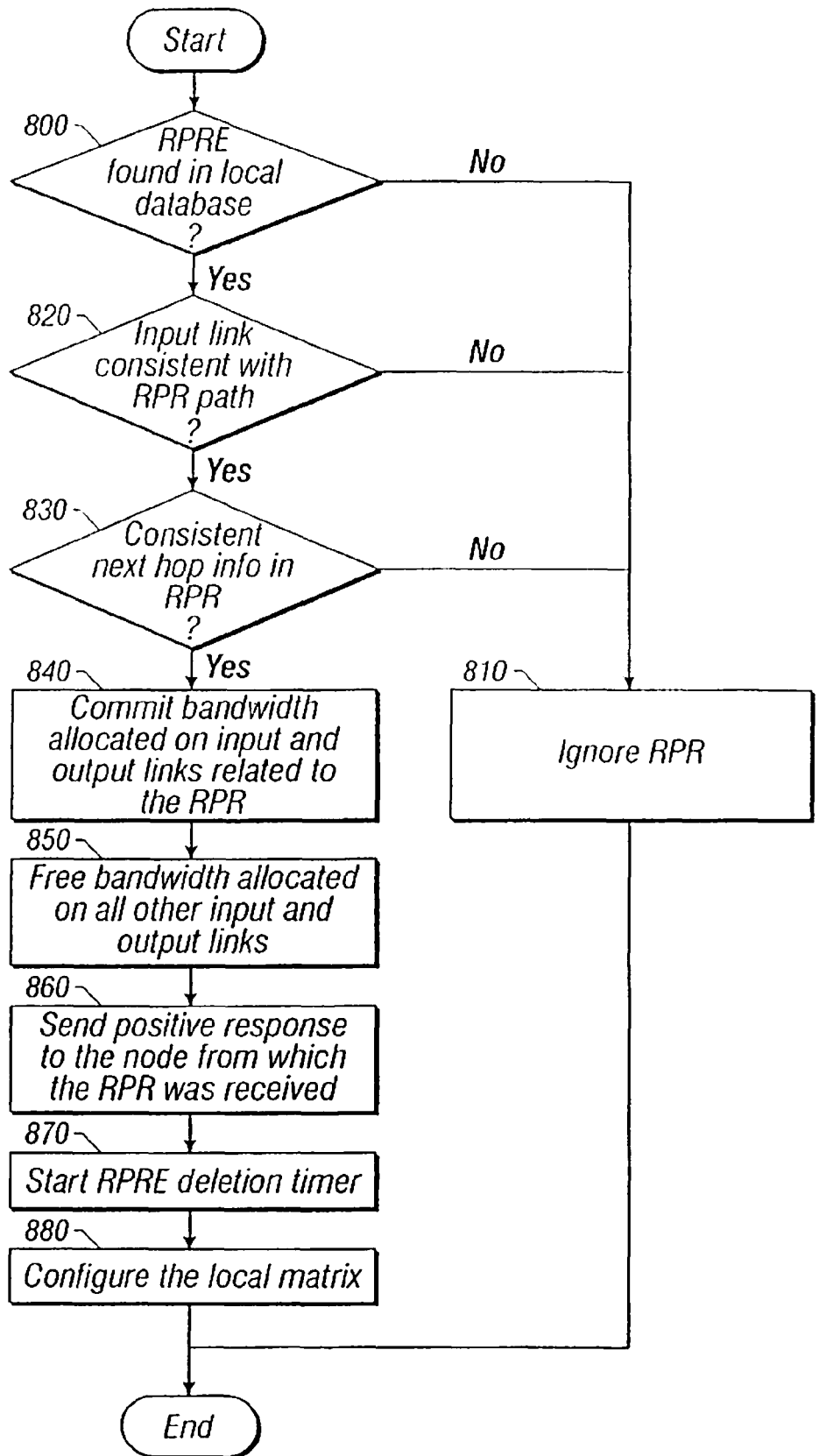
FIG. 8 Is a flow diagrams illustrating the processes performed by originating nodes that receive negative RPR responses.

The Processing of Received RPR Responses by the Origination Node:

FIGS. 7 and 8 are flow diagrams illustrating the processes performed by originating nodes that receive negative and positive RPR responses, respectively. Negative RPR responses are processed as depicted in FIG. 7. An originating node begins processing a negative RPR response by determining whether the node has an RPRE associated with the RPR (step 700). If the receiving node does not have an RPRE for the received RPR response, the RPR response is ignored (step 705). If an associated RPRE is found, the receiving node determines whether the node sending the RPR response is listed in the RPRE (e.g., is actually in the SentTo list of the RPRE) (step 710). If the sending node is not listed in the RPRE, again the RPR response is ignored (step 705).

If the sending node is listed in the RPRE, the RPR sequence number is analyzed to determine its validity (step 715). As with the previous steps, if the RPR contains an invalid sequence number (e.g., doesn't fall between FirstSequenceNumber and LastSequence Number, inclusive), the RPR response is ignored (step 705). If the RPR sequence number is valid, the receiving node determines whether Flush or Terminate in the RPR response (step 720). If neither of these is specified, the RPR response sequence number is compared to that stored in the last sequence field of the RPR (step 725). If the RPR response sequence number does not match that found in the last sequence field of the RPRE, the RPR response is again ignored (step 705). If the RPR response sequence number matches that found in the RPRE, or a Flush or Terminate was specified in the RPR, the input link on which the RPR response was received is compared to that listed in the RPR response path field (e.g., Response.Path [Response.PathIndex]==InputLinkID) (step 730). If the input link is consistent with information in the RPR, the next hop information in the RPR is checked for consistency (e.g., Response.Path [Response.PathIndex+1]==RPRE.ReceivedFrom) (step 735). If either of the proceeding two tests are failed, the RPR response is again ignored (step 705).

If a Terminate was specified in the RPR response (step 740), the bandwidth on all links over which the RPR was forwarded is freed (step 745) and the Terminate and Flush bits from the RPR response are saved in the RPRE (step 750). If a Terminate was not specified in the RPR response, bandwidth is freed only on the input link (i.e., the link from which the response was received) (step 755). The Terminate and Flush bits are saved in the RPRE (step 760), and the Flush bit of the RPR is cleared (step 765). If a Terminate was not specified in the RPR, the Pending Replies field in the RPRE is decremented (step 770). If this field remains non-zero after being decremented, the process completes. If Pending Replies is equal to zero at this point, or a Terminate was not specified in the RPR, the RPR is sent to the node specified in the RPR's Received From field (i.e. the node that sent the corresponding request) (step 780). Next, the bandwidth allocated on the link to the node specified in the RPR's Received From field is released (step 785), and an RPR deletion timer is started (step 790).

FIG. 8 illustrates the steps taken in processing positive RPR responses. The processing of positive RPR responses begins at step 800 with a search of the local database to determine whether an RPRE corresponding to the RPR response is stored therein. If a corresponding RPRE cannot be found, the RPR response is ignored (step 810). If the RPR response RPRE is found in the local database, the input link is verified as being consistent with the path stored in the RPR (step 820). If the input link is not consistent with the RPR path, the RPR response is ignored once again (step 810). If the input link is consistent with path information in the RPR, the next hop information specified in the RPR response path is compared with the Received From field of the RPRE (e.g., Response.Path[Response.PathIndex+1]!=RPRE.Received-From) (step 830). If the next hop information is not consistent, the RPR response is again ignored (step 810). However, if the RPR response's next hop information is consistent, bandwidth allocated on input and output links related to the RPR is committed (step 840). Conversely, bandwidth allocated on all other input and output links for that VP is freed at this time (step 850). Additionally, a positive response is sent to the node from which the RPR was received (step 860), and an RPR deletion timer is started (step 870) and the local matrix is configured (step 880).

With regard to matrix configuration, the protocol pipelines such activity with the forwarding of RPRs in order to minimize the impact of matrix configuration overhead on the time required for restoration. While the response is making its way from node N1 to node N2, node N1 is busy configuring its matrix. In most cases, by the time the response reaches the origin node, all nodes along the path have already configured their matrices.

The Terminate indicator prevents "bad" instances of an RPR from circulating around the network for extended periods of time. The indicator is propagated all the way back to the originating node and prevents the originating node, and all other nodes along the path, from sending or forwarding other copies of the corresponding RPR instance.

Terminating RPR Packets are processed as follows. The RPR continues along the path until one or more of the following four conditions are encountered:

1. Its HOP_COUNT reaches the maximum allowed (i.e. MAX_HOPS).
2. The request reaches a node that doesn't have enough bandwidth on any of its output links to satisfy the request.
3. The request reaches a node that had previously accepted a different instance of the same request from another neighbor.
4. The request reaches its ultimate destination: the target node, which is either the Destination node of the VP, or a proxy node if the Source and Destination nodes are located in difference zones.

Conditions 1, 2 and 3 cause a negative response (NAK) to be sent back to the originating node, flowing along the path carried in the request, but in the reverse direction.

Further optimizations of the protocol can easily be envisioned by one of skill in the art and are intended to be within the scope of this specification. For example, in one embodiment, a mechanism is defined to further reduce the amount of broadcast traffic generated for any given VP. In order to prevent an upstream neighbor from sending the same instance of an RPR every T milliseconds, a tandem node can immediately return a no-commit positive response to that neighbor, which prevents the neighbor from sending further copies of the instance. The response simply acknowledges the receipt of the request, and doesn't commit the sender to any of the requested resources. Preferably, however, the sender (of the positive response) periodically transmits the acknowledged request until a valid response is received from its downstream neighbor(s). This mechanism implements a piece-wise, or hop-by-hop, acknowledgment strategy that limits the scope of retransmitted packets to a region that gets progressively smaller as the packet gets closer to its target node.

Optimizations

However, it is prudent to provide some optimizations for the efficient handling of errors. Communication protocols often handle link errors by starting a timer after every transmission and, if a valid response isn't received within the timeout period, the message is retransmitted. If a response isn't received after a certain number of retransmission, the sender generates a local error and disables the connection. The timeout period is usually a configurable parameter, but in some cases the timeout period is computed dynamically, and continuously, by the two end points. The simplest form of this uses some multiple of the average round trip time as a timeout period, while others use complex mathematical formulas to determine this value. Depending on the distance between the two nodes, the speed of link that connects them, and the latency of the equipment along the path, the timeout period can range anywhere from millisecond to seconds.

The above strategy of handling link errors can be improved upon, however, the fast restoration times required dictate that 2-way, end-to-end communication be carried out in less than 50 ms. A limitation of the above-described solution is the time wasted while waiting for an acknowledgment to come back from the receiving node. A safe timeout period for a 2000 mile span, for instance, can be 35 ms or more, in which case there is not enough time for a retransmission in case of an error.

This problem is addressed in one embodiment by taking advantage of the multiple communication channels (i.e. OC-48's) that exist between nodes to:

1. Send N copies (N>=1) of the same request over as many channels, and
2. Re-send the request every T milliseconds (1 ms<10 ms) until a valid response is received from the destination node.

Preferably, the amount of packets sent is carefully controlled that the broadcast does not create congestion in the network. The link efficiency is improved further by using small packets during the restoration procedure. The present invention can be practiced on a network node/element such as that described below.

Figure 9:
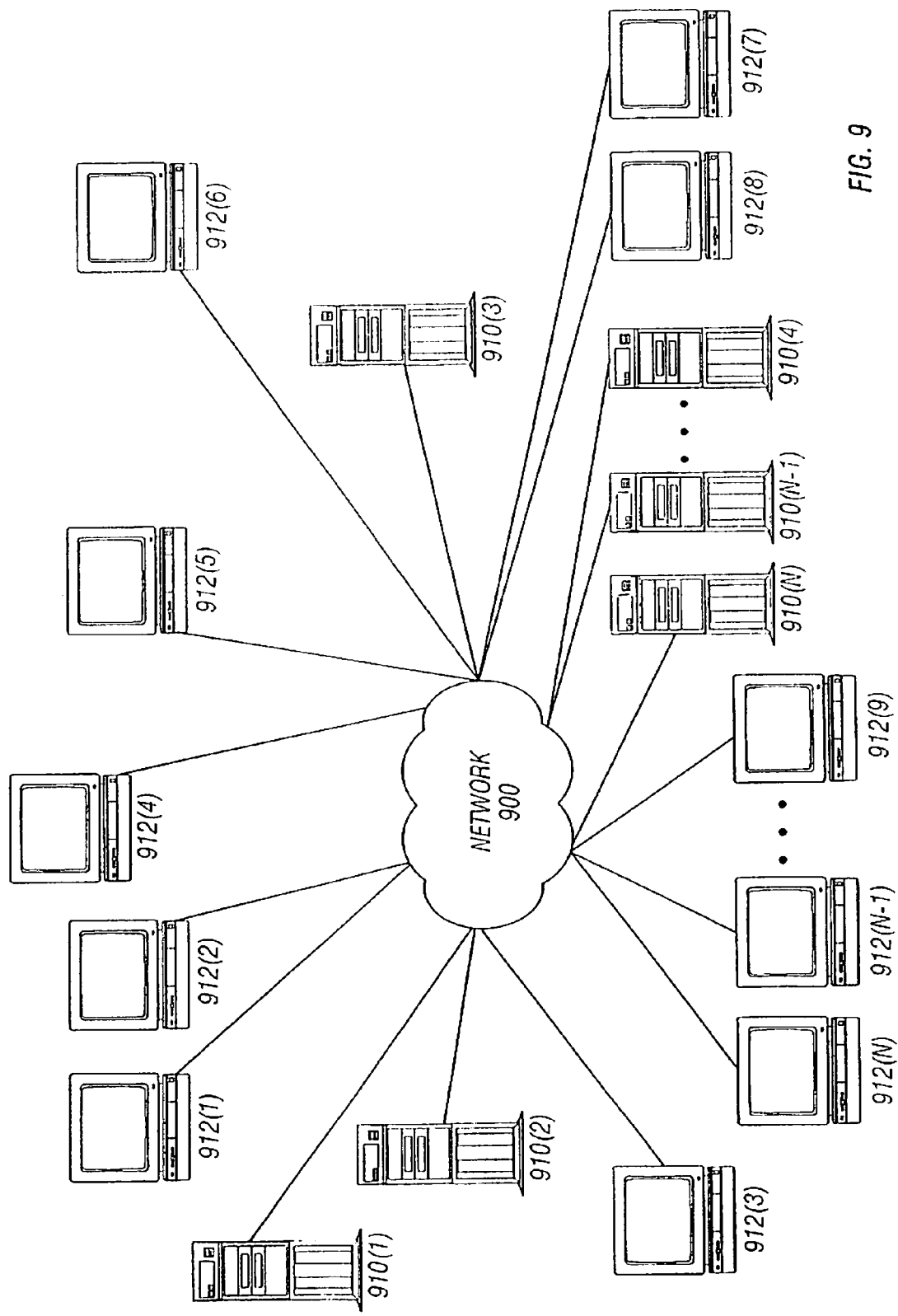
FIG. 9 is a block diagram illustrating network environment in a commercial transaction processing system.

FIG. 9 is a block diagram illustrating network environment in which a commercial transaction processing system according to the present invention may be practiced. As is illustrated in FIG. 9, a network 900, such as a private wide area network (WAN) or the Internet includes a number of networked servers 910(1)-(N) that are accessible by client terminals 912(1)-(N). Communication between client terminals 912(1)-(N) and servers 910(1)-(N) typically occurs over a publicly accessible network, such as a public switched telephone network over ADSL telephone lines or large bandwidth trunks, for example communications channels providing T1 or OC3 service. Client terminals 912(1)-(N) access servers 910(1)-(N) through a service provider, e.g., an Internet service provider such as America On-Line™, Prodigy™, CompuServe™ and the like, by executing application specific software, commonly referred to as a browser, on one of client terminals 912(1)-(N).

One or more of client terminals 912(1)-(N) and/or one or more of servers 910(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems, which are designed to provide computing power to one or more users, either locally or remotely. Such a computer system may also include one or a plurality of I/O devices (i.e. peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided either as an integrated or peripheral device. One such exemplary computer system discussed in terms of client terminals 912(1)-(N) is shown in detail in FIG. 10.

Figure 10:
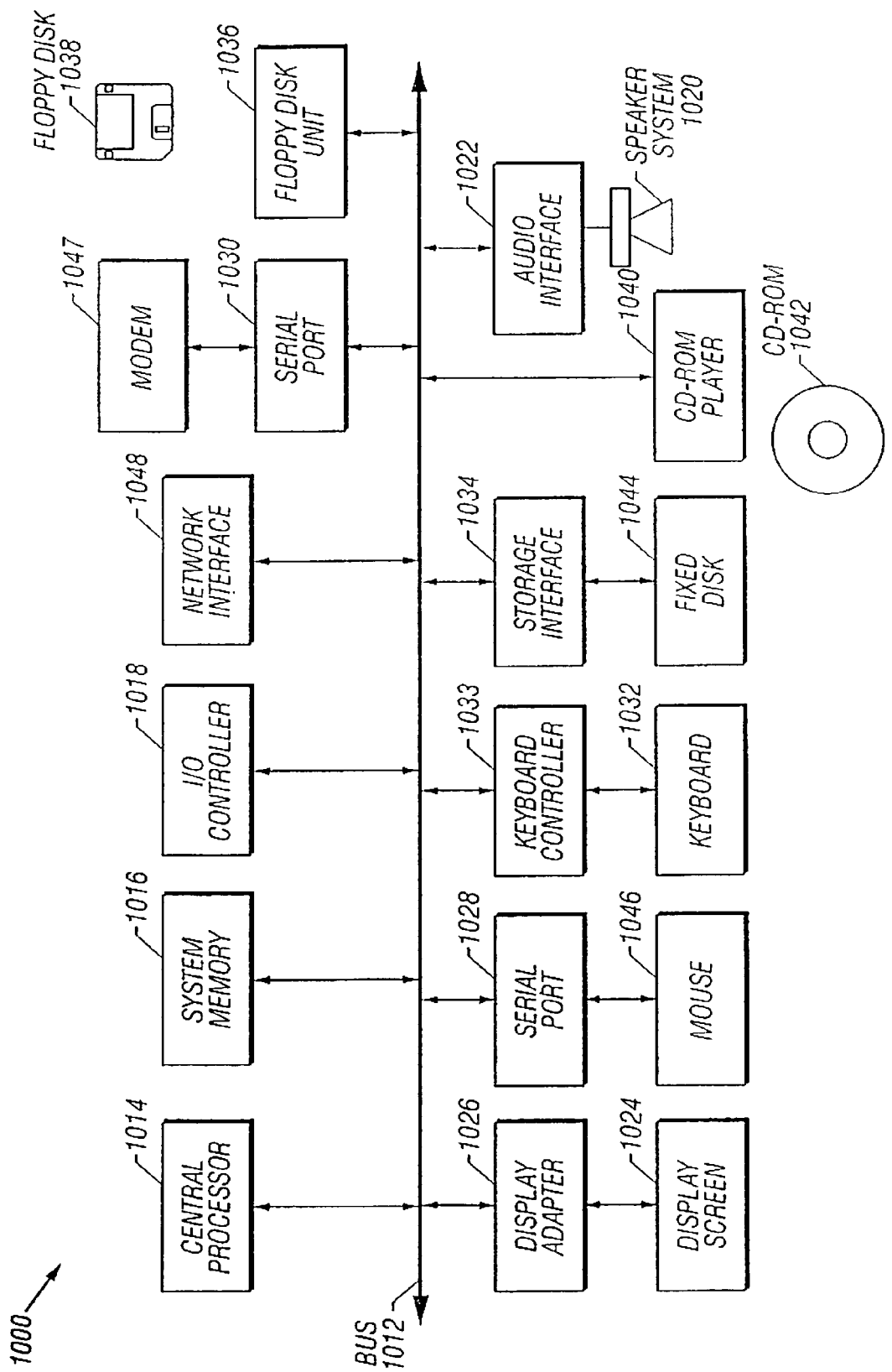
FIG. 10 is a block diagram of a host computer system suitable for implementing the present invention.

FIG. 10 depicts a block diagram of a host computer system 1000 suitable for implementing the present invention, and exemplary of one or more of client terminals 912(1)-(N). Host computer system 1000 includes a bus 1012 which interconnects major subsystems of host computer system 1000. These subsystems include a central processor 1014, a system memory 1016 (typically RAM, but which may also include ROM, flash RAM, or the like), an input/output controller 1018, an external audio device such as a speaker system 1020 via an audio output interface 1022, an external device such as a display screen 1024 via display adapter 1026, serial ports 1028 and 1030, a keyboard 1032 (interfaced with a keyboard controller 1033), a storage interface 1034, a floppy disk drive 1036 operative to receive a floppy disk 1038, and a CD-ROM drive 1040 operative to receive a CD-ROM 1042. Also included are a mouse 1046 (or other point-and-click device, coupled to bus 1012 via serial port 1028), a modem 1047 (coupled to bus 1012 via serial port 1030) and a network interface 1048 (coupled directly to bus 1012).

Bus 1012 allows data communication between central processor 1014 and system memory 1016, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with host computer system 1000 are generally stored on and accessed via a computer readable medium, such as a hard disk drive (e.g., fixed disk 1044), an optical drive (e.g., CD-ROM drive 1040), floppy disk unit 1036 or other storage medium. Additionally, applications may be in the form of electronic signals modulated in accordance with the application and data communication technology when accessed via network modem 1047 or interface 1048.

Storage interface 1034, as with the other storage interfaces of host computer system 1000, may connect to a standard computer readable medium for storage and/or retrieval of information, such as a fixed disk drive 1044. Fixed disk drive 1044 may be a part of host computer system 1000 or may be separate and accessed through other interface systems. Many other devices can be connected such as a mouse 1046 connected to bus 1012 via serial port 1028, a modem 1047 connected to bus 1012 via serial port 1030 and a network interface 1048 connected directly to bus 1012. Modem 1047 may provide a direct connection to a remote server via a telephone link or to the Internet via an internet service provider (ISP). Network interface 1048 may provide a direct connection to a remote server via a direct network link to the Internet via a POP (point of presence).

Many other devices or subsystems (not shown) may be connected in a similar manner. Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be operably disposed or stored in computer-readable storage media such as one or more of system memory 1016, fixed disk 1044, CD-ROM 1042, or floppy disk 1038.

It will be noted that the variable identifier "N" is used in several instances in FIG. 10 to more simply designate the final element (e.g., servers 910(1)-(N) and client terminals 912(1)-(N)) of a series of related or similar elements (e.g., servers and client terminals). The repeated use of such variable identifiers is not meant to imply a correlation between the sizes of such series of elements, although such correlation may exist. The use of such variable identifiers does not require that each series of elements have the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of host computer system 1000). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Figure 11:
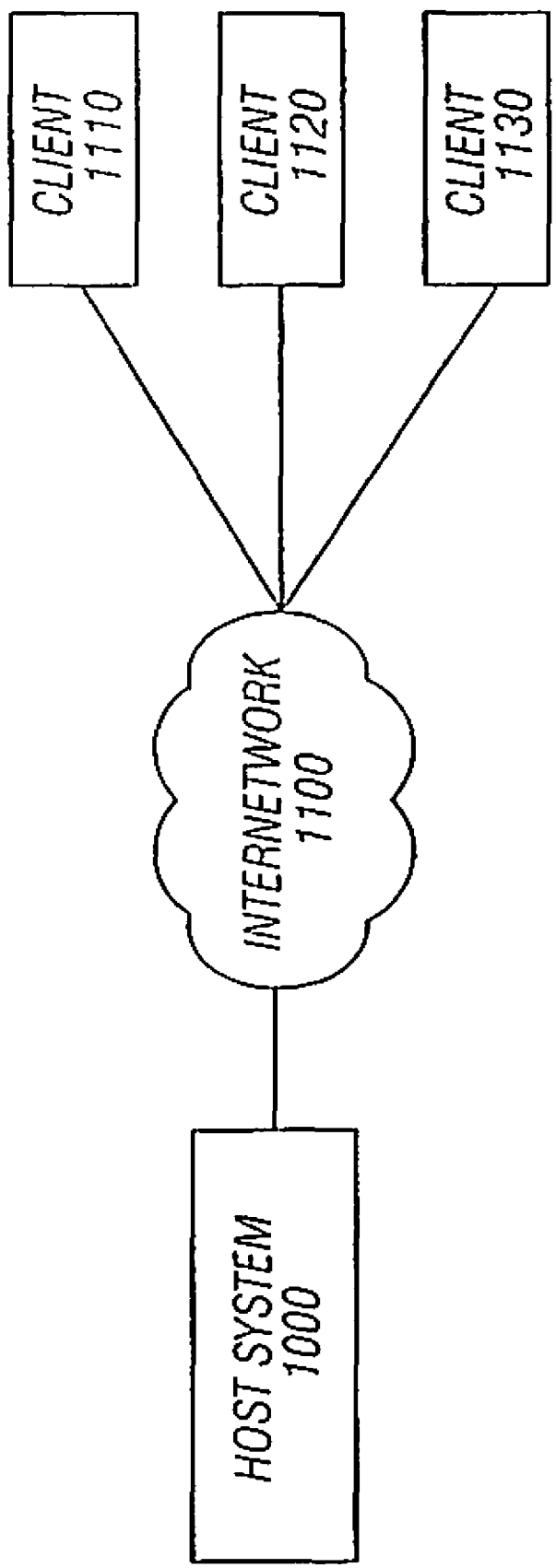
FIG. 11 illustrates the interconnection of host computer system to client systems.

FIG. 11 depicts the interconnection of host computer system 1000 to client systems 1110, 1120 and 1130. FIG. 11 depicts internetwork 11100 (e.g., the Internet) interconnecting client systems 1110, 1120 and 1130. With reference to host computer system 1000, modem 1047 or some other network interface can be used to provide connectivity from host computer system 1000 to internetwork 1100. Protocols for exchanging data via the Internet are well known to those skilled in the art. Although FIG. 11 depicts the use of the Internet for exchanging data, the present invention is not limited to the Internet or any particular network-based environment.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for restoring a virtual path in an optical network, the method comprising:
   receiving a resource request packet at an intermediate node, wherein said resource request packet is configured for broadcast in said optical network;
   dynamically determining whether said intermediate node has a resource necessary to support said virtual path;
   only if said dynamically determining indicates that said intermediate node has said resource necessary to support said virtual path, forwarding said resource request packet; and
   only if said dynamically determining indicates that said intermediate node lacks said resource necessary to support said virtual path, preventing said resource request packet from being forwarded.

2. The method of claim 1, further comprising:
   if said intermediate node lacks said resource necessary to support said virtual path, returning a negative acknowledgment message to a node that originated said resource request packet.

3. The method of claim 1, wherein said resource request packet comprises fields for identifying at least one previously traversed link.

4. The method of claim 1, wherein said resource request packet is configured for broadcast in said optical network by virtue of comprising at least one of (a) fields for identifying previously traversed links and (b) a hop count field.

5. The method of claim 1, wherein said resource request packet is among a plurality of resource request packets broadcasted to a plurality of nodes in said optical network.

6. The method of claim 1, further comprising:
   broadcasting a plurality of resource request packets to a plurality of nodes in said optical network, wherein said plurality of resource request packets comprises said resource request packet;
   dynamically identifying a plurality of nodes with resources as a result of said broadcasting, wherein said nodes with resources are ones of said nodes having a resource necessary to support said virtual path;
   dynamically determining an alternate physical path, said alternate physical path comprising ones of said nodes with resources; and
   configuring said alternate physical path by establishing a communication connection between said ones of said nodes with resources.

7. The method of claim 6, further comprising:
   restoring said virtual path by provisioning said virtual path over said alternate physical path.

8. The method of claim 1, further comprising:
   temporarily allocating said resource necessary to support said virtual path.

9. The method of claim 8, further comprising:
   receiving a negative response to the forwarded resource request packet; and
   releasing the temporarily allocated resource in response to the negative response.

10. The method of claim 8, further comprising:
    receiving a positive response to the forwarded resource request packet; and
    committing the temporarily allocated resource in response to the positive response.

11. A system for restoring a virtual path in an optical network, the system comprising:
    means for receiving a resource request packet at an intermediate node, wherein said resource request packet is configured for broadcast in said optical network;
    means for dynamically determining whether said intermediate node has a resource necessary to support said virtual path;
    means for, only if said means for dynamically determining indicates that said intermediate node has said resource necessary to support said virtual path, forwarding said resource request packet; and
    means for, only if said means for dynamically determining indicates that said intermediate node lacks said resource necessary to support said virtual path, preventing said resource request packet from being forwarded.

12. The system of claim 11, further comprising:
    means for, if said intermediate node lacks said resource necessary to support said virtual path, returning a negative acknowledgment message to a node that originated said resource request packet.

13. The system of claim 11, wherein said resource request packet comprises fields for identifying at least one previously traversed link.

14. The system of claim 11, wherein said resource request packet is configured for broadcast in said optical network by virtue of comprising at least one of (a) fields for identifying previously traversed links and (b) a hop count field.

15. A computer readable storage medium having encoded thereon instructions executable by a computer system for restoring a virtual path in an optical network, said instructions being configured to execute acts of:
    receiving a resource request packet at an intermediate node, wherein said resource request packet is configured for broadcast in said optical network;
    dynamically determining whether said intermediate node has a resource necessary to support said virtual path;
    only if said determining indicates that said intermediate node has said resource necessary to support said virtual path, forwarding said resource request packet; and
    only if said determining indicates that said intermediate node lacks said resource necessary to support said virtual path, preventing said resource request packet from being forwarded.

16. A system comprising:
    a memory comprising instructions; and
    a processor coupled to the memory and configured to execute the instructions to:
        examine a resource request packet, wherein
            said resource request packet indicates a resource necessary to support a virtual path in an optical network,
            said optical network comprises a plurality of nodes,
            said processor is comprised in a first node among said plurality of nodes, and said first node is a node other than endpoint nodes of said virtual path;

dynamically determine whether said first node has said resource necessary to support said virtual path;

forward said resource request packet to a subsequent node in said optical network based at least in part on a determination that said intermediate node has said resource necessary to support said virtual path; and prevent said resource request packet from being forwarded from said first node based at least in part on a determination that said intermediate node lacks said resource necessary to support said virtual path.

17. The system of claim 16, wherein said processor is further configured to:

if said intermediate node lacks said resource necessary to support said virtual path, return a negative acknowledgment message to a node that originated said resource request packet.

18. The system of claim 16, wherein:

said resource request packet comprises fields for identifying at least one previously traversed link;

said resource request packet is comprises a hop count field; and said resource request packet is among a plurality of resource request packets broadcasted to a plurality of nodes in said optical network.

19. The system of claim 16, wherein said processor is further configured to:

broadcast a plurality of resource request packets to a plurality of nodes in said optical network, wherein said plurality of resource request packets comprises said resource request packet;

dynamically identify a plurality of nodes with resources as a result of said broadcasting, wherein said nodes with resources are ones of said nodes having a resource necessary to support said virtual path;

dynamically determine an alternate physical path, said alternate physical path comprising ones of said nodes with resources; and establish a communication connection between said ones of said nodes with resources.

20. The system of claim 19, wherein said processor is further configured to:

restore said virtual path by provisioning said virtual path over said alternate physical path.

* * * * *